United States Patent [19]

Dolan

[11] 4,340,505
[45] Jul. 20, 1982

[54] REDUCING PRECIOUS METAL USE IN CATALYST SUBSTRATES

[75] Inventor: Calvin M. Dolan, King of Prussia, Pa.

[73] Assignee: Johnson Matthey, Inc., Malvern, Pa.

[21] Appl. No.: 258,300

[22] Filed: Apr. 28, 1981

[51] Int. Cl.³ .................. B01J 21/04; B01J 23/40; B01J 35/04

[52] U.S. Cl. .................. 252/466 PT; 252/472; 252/477 R; 422/180

[58] Field of Search ............ 252/477 R, 466 PT, 472; 422/177, 180; 428/36, 102, 103, 104

[56] References Cited

U.S. PATENT DOCUMENTS

| | | | |
|---|---|---|---|
| 3,771,967 | 11/1973 | Nowak | 422/180 |
| 3,941,159 | 3/1976 | Toll | 428/36 X |
| 4,282,279 | 8/1981 | Strickland | 428/102 X |
| 4,289,652 | 9/1981 | Hunter et al. | 252/477 R |

*Primary Examiner*—W. J. Shine

*Attorney, Agent, or Firm*—Cushman, Darby & Cushman

[57] ABSTRACT

A precious metal coated interior and uncoated exterior catalyst is formed from a cylindrical substrate with a circumferential periphery and an interior honeycomb structure. A jacket of liquid impermeable material is wrapped around the substrate circumferential periphery, and the jacket ends are fastened together with hook-and-pile fasteners or the like. The wrapped cylindrical catalyst substrate is passed through a shower of precious metal liquid solution or suspension so that the honeycomb structure surfaces are coated with precious metal. Because the jacket is disposed around the substrate circumferential periphery, the circumferential periphery does not get coated. The jacket is removed by disconnecting the hook-and-pile fasteners, and the jacket can be rinsed off with a rinse liquid and the used rinsed liquid may be collected and used for subsequent substrate showers. The jacket is reuseable to wrap other substrates.

12 Claims, 4 Drawing Figures

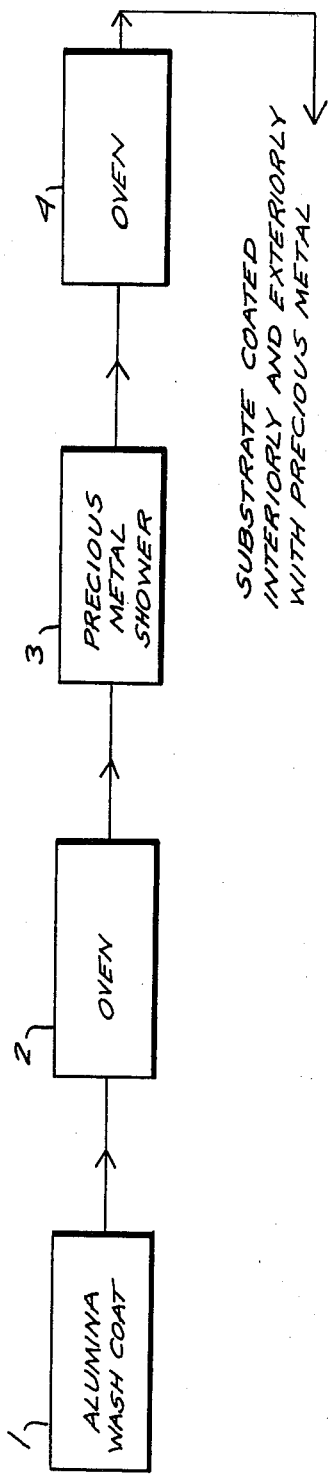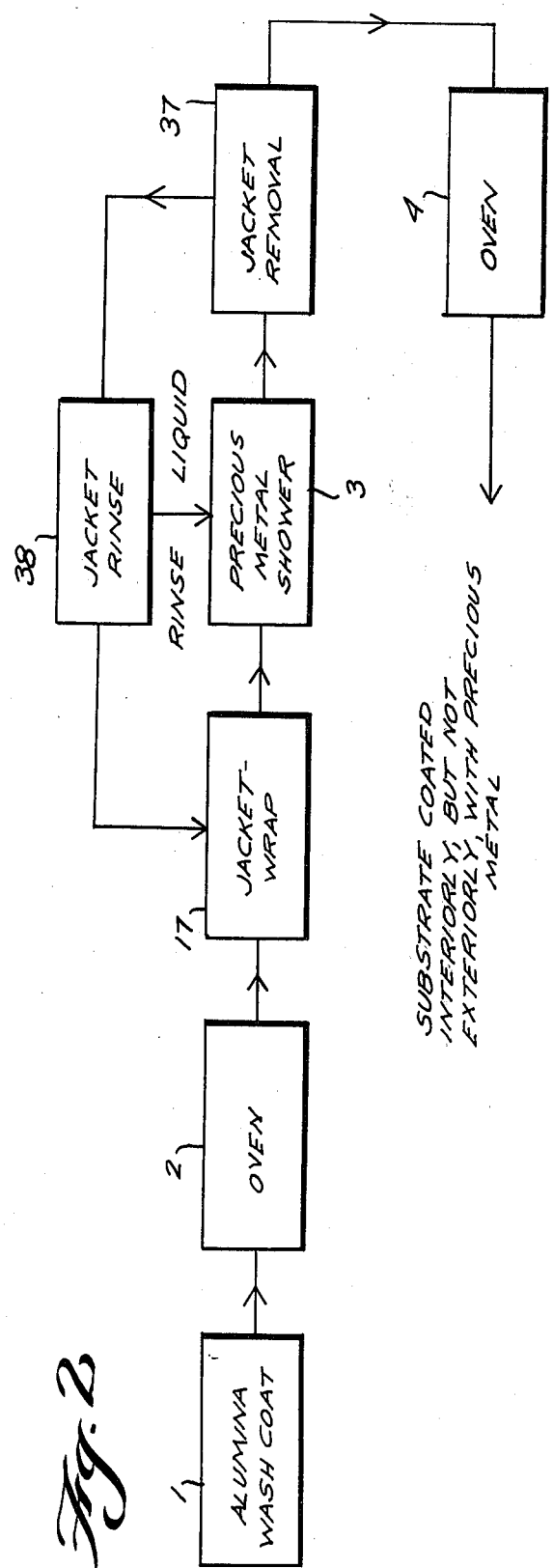

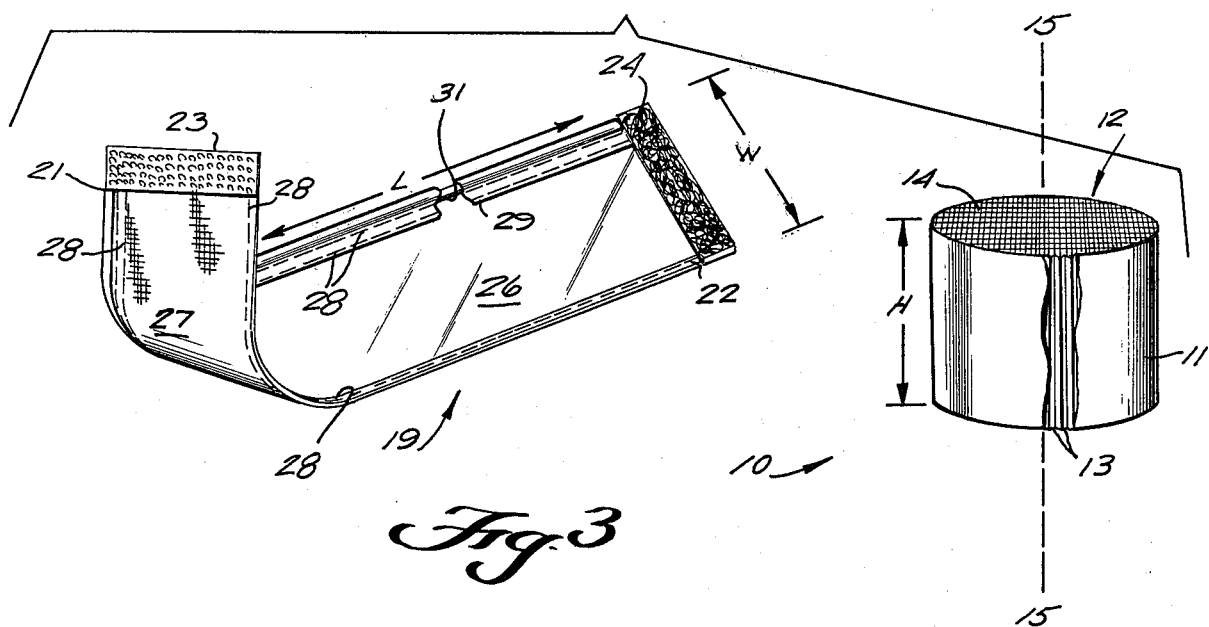
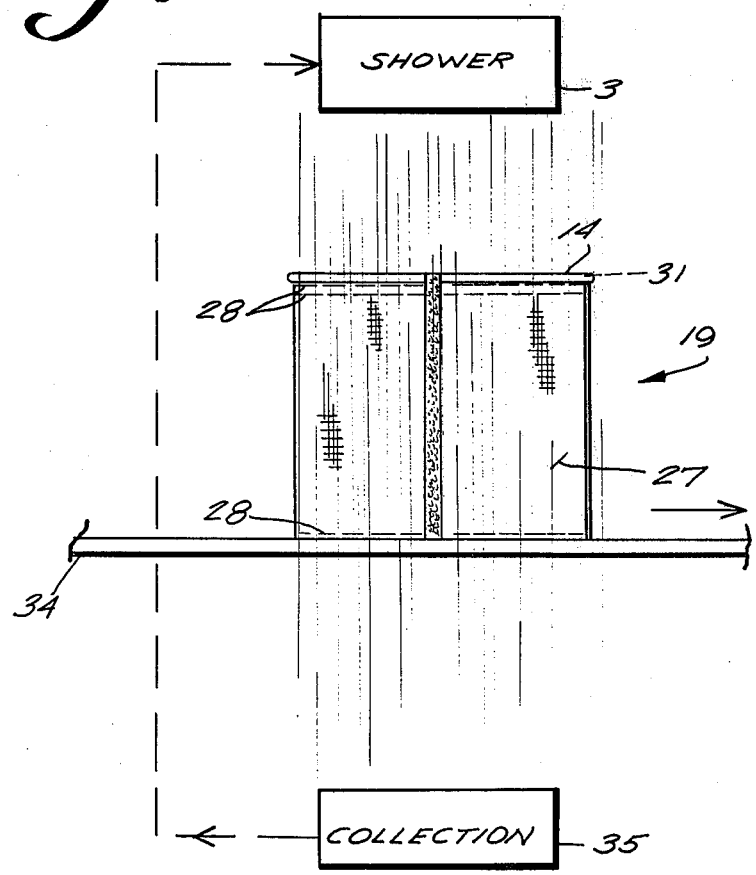

REDUCING PRECIOUS METAL USE IN CATALYST SUBSTRATES

BACKGROUND AND SUMMARY OF THE INVENTION

In the conventional construction of coated catalysts, a cylindrical catalyst substrate (normally either circular or elliptical in cross-section) having a circumferential periphery and an interior honeycomb structure is coated with precious metal. The substrate is first subjected to an alumina wash coat, fired in an oven, and then passed under a precious metal liquid solution or suspension shower. Conventionally the shower is an aqueous precious metal solution shower. The aqueous metal solution coats the entire substrate, including the interior honeycomb structure and the circumferential periphery. The substrate is then fired to produce the final coated catalyst.

While the coated catalyst produced according to conventional techniques perform their intended functions very well, they are unnecessarily expensive since the precious metal coating on the circumferential periphery of the substrate is unnecessary (no gaseous components to be catalyzed are ever brought into contact therewith during normal use of the catalyst substrate during normal use). The circumferential periphery also has a tendency to collect a thicker coating thereon than the interior honeycomb structure, resulting in even more wastage of platinum, palladium, rhodium and like precious metals. This is especially important since when the catalyst substrates are utilized as the catalytic components of catalytic converters for motor vehicles they are (under present procedures) disposed of, resulting in a net loss of precious metal.

In order to prevent the waste of precious metal in this manner, there have been various proposals for significantly reducing the precious metal coating on the cylindrical catalyst substrate circumferential periphery. One proposal has been to utilize cellulose based Cellon shrink seal material. A sheet of Cellon is applied wet in an expanded form as an exterior wrap for the substrate, with an intermediate area wrapped with duct tape. The wrapped substrate is then carefully dried with convected air at a temperature of about 110° C., and the substrate is passed through the precious metal containing liquid shower. The wrap is then removed prior to firing of the substrate, and discarded. While such a proposal is effective in reducing the amount of coating of the circumferential periphery of the substrate by platinum, palladium, and the like, the technique is not readily practiced, is not suited to conventional production methods, and reduces metal concentration in several peripheral cells of the honeycomb structure. Additionally, the accessory drying step must be practiced prior to passing the substrate under the precious metal containing liquid shower.

Another prior proposal for reducing the concentration of precious metal on the substrate circumferential periphery is to spray a silicone solution onto the substrate, and then dry the substrate at about 80° C. for about an hour. The silicone spray is effective in reducing precious metal concentrations on the substrate circumferential periphery, however the extra costs associated with the silicone spraying and related necessary steps may be substantial enough to significantly offset any savings resulting from minimizing precious metal wastage.

According to the present invention a method (and device for implementation of the method) is provided which allows significant savings in precious metal usage during the production of coated catalysts in a simple and easy manner, and without significantly increasing the costs of producing the coated substrate and without introducing significant time delays into the processing sequence.

According to the present invention, a method of producing a coated catalyst from a cylindrical catalyst substrate having a circumferential periphery and an interior honeycomb structure is provided utilizing a jacket of liquid impermeable material having first and second ends, fastening means for attaching the first and second ends together and having a height substantially the same as the height of the cylindrical catalyst substrate. The fastening means preferably are hook-and-pile fastening components commonly sold under the name VELCRO.

A method according to the present invention comprises the following steps: (a) Wrapping the jacket around the cylindrical catalyst substrate circumferential periphery and fastening the jacket ends together, to provide a cylindrical catalyst substrate having the circumferential periphery thereof covered so that a precious metal liquid solution or suspension will not coat it. (b) Passing the wrapped cylindrical catalyst substrate through a shower of precious metal liquid solution or suspension so that the honeycomb structure surfaces are coated with precious metal. (c) Removing the jacket by releasing the fastening means attaching the ends thereof together so as to provide a cylindrical catalyst substrate having a precious metal coated interior honeycomb structure and a circumferential periphery uncoated by precious metal.

The method also preferably comprises the further step of (d) reusing the removed jacket to wrap other cylindrical catalyst substrates. Additionally, the wrapping of the jacket around the substrate consists of the only substep for covering the circumferential periphery of the substrate, no drying or other time-delay introducing steps being necessary. Between steps (c) and (d), the jacket may be rinsed off with a rinse liquid, the used rinse liquid collected, and the collected rinse liquid used as a component of the shower of step (b).

A jacket particularly adapted for wrapping a cylinder in practicing the method of the present invention is also provided according to the present invention. The jacket comprises a first rectangular flexible sheet comprising a liquid-impermeable plastic film or the like, such as a polyvinyl or polyethylene film. A second rectangular flexible sheet is also provided comprising a liquid resistant fabric, such as a fabric of nylon or Dacron. The first and second sheets have substantially the same length and width, and means are provided for attaching the sheets together along at least the edges thereof to provide a liquid impermeable jacket. A pile fastening component is attached to the jacket along the width thereof at a first end thereof, and a hook fastening component, compatible with the pile fastening component, is attached to the jacket along the width thereof at a second end thereof. If necessary or desirable a piece of resilient material may be operatively disposed along the length of the jacket at one edge thereof for providing enhanced sealing when wrapped around the cylindrical catalyst substrate, and the resilient material may be held in place by overlapping portions of the second sheet stitched together with the body of the second sheet and the first sheet. Alternatively, the jacket can be a single sheet of fiber-reinforced water impermeable plastic film.

It is the primary object of the present invention to simply and economically effect reduction of the amount of precious metal on the circumferential periphery of a coated catalyst formed from a cylindrical catalyst substrate. This and other objects of the invention will become clear from an inspection of the detailed description of the invention, and from the appended claims.

BRIEF DESCRIPTION OF THE DRAWINGS

FIG. 1 is a schematic view showing an exemplary prior art procedure for the production of a coated catalyst particularly for use in a catalytic converter for a motor vehicle;

FIG. 2 illustrates schematically the steps of a method according to the present invention;

FIG. 3 is a perspective view of an exemplary jacket, with cylindrical catalyst substrate around which the jacket will be wrapped, according to the present invention; and FIG. 4 is a side view schematically illustrating a wrapped cylindrical catalyst substrate being subjected to a precious metal containing liquid shower according to the teachings of the present invention.

DETAILED DESCRIPTION OF THE DRAWINGS

The procedural steps in a conventional method of producing a coated catalyst from a cylindrical catalyst substrate is illustrated schematically in FIG. 1. At station 1 an alumina wash coat, utilizing a water slurry of alumina, is applied to a cylindrical catalyst substrate to give more surface area to the substrate for coating by the precious metal catalyst. After alumina wash coating, the substrate is fired in an oven 2, and then is conveyed to a precious metal containing liquid shower at a station 3. The precious metal containing liquid may be a solution or a suspension of precious metal in liquid, but most conventionally comprises an aqueous precious metal solution. The term "shower" used to describe the precious metal containing liquid application step is very broad, and covers sprays, jets, sluicing, and the like. Afer the precious metal shower at station 3, the substrate is again fired in an oven, oven 4, in which breakdown of the aqueous solution is effected, to provide as the final product a substrate coated interiorily and exteriorily with precious metal.

A typical cylindrical catalyst substrate utilizable in the practice of the prior art and inventive methods is illustrated generally at 10 in FIG. 3. The term "cylindrical" in the present specification and claims is used in a very broad sense, and is intended to encompass a wide variety of cross-sectional areas and shapes, including conventional prisms. Usually, however, the substrate 10 will have a circular or elliptical cross-section. The substrate 10 is a commercially available ceramic substrate having a relatively smooth circumferential periphery 11, and an interior honeycomb structure 12. The honeycomb structure conventionally includes a plurality of passageways 13 (see the cut-away portion of the substrate 10 in FIG. 3) extending from the top radial peripheral surface 14 out the substrate 10 through the bottom radial peripheral surface (not shown), and is substantially parallel to the cylinder axis 15—15.

According to the method of the present invention, it is desired to substantially decrease or eliminate the precious metal coating of the circumferential periphery 11 of the substrate 10 which inherently occurs during the practice of the prior art method illustrated in FIG. 1. The precious metal coating on the circumferential periphery 11 is essentially wasted since gases to be catalyzed normally do not pass in contact therewith when the coated catalyst is utilized in the most common manner—namely as a component of a catalytic converter for motor vehicles.

The method steps according to the present invention are illustrated schematically in FIG. 2. As in the prior art, an alumina wash coat station 1, precious metal shower station 3, and ovens 2 and 4 are provided. The inventive method is also applicable to prior art procedures wherein the alumina wash coat and precious metal shower are provided simultaneously. According to the present invention, however, prior to the precious metal shower station 3, a jacket-wrap station 17 is provided. The substrate has cooled since exiting oven 2 before reaching station 17.

At the jacket-wrap station 17, the circumferential periphery 11 of the substrate 10 is covered in a simple and cost-effective manner. This covering consists of the substep of wrapping a jacket, such as jacket 19 illustrated in FIG. 3, around the circumferential periphery 11 of the substrate 10 and fastening the jacket ends together to provide a cylindrical catalyst substrate having the circumferential periphery 11 thereof covered (see FIG. 4) so that a precious metal liquid solution or suspension will not coat it.

The jacket 19 may take a wide variety of forms and be constructed of a wide variety of materials. In general, the desired properties of the jacket 19 are that it is slightly stretchable so as to provide a tight seal around the periphery 11 when drawn tightly into contact therewith, has end fasteners that are readily applied and removed, covers the entire height of the cylindrical substrate 10 (i.e. covers the entire surface 11) without (or substantially without) overlapping it at the top and bottom, most preferably is readily reuseable to wrap other substrates, and can have any precious metal solution which does adhere thereto readily removed and recovered before reuse.

In the presently preferred embodiment illustrated in FIG. 3, the jacket 19 is rectangular in shape and has a first end 21 thereof and a second end 22 thereof, fastening means being associated with the ends 21, 22. The fastening means preferably comprise a hook fastener component 23 attached to the first end 21 and bridging the entire width W of the jacket, and a pile fastener component 24 attached to the second end 22 and bridging the entire width W of the jacket 19. The hook-and-pile components 23, 24 are conventionally sold under the name VELCRO.

The jacket 19 illustrated in FIG. 3 further comprises a first rectangular sheet 26 comprising a liquid impermeable plastic film, and a second rectangular flexible sheet 27 comprising a liquid resistant fabric. The sheets 26, 27 have substantially the same length L and width W. Means are provided for attaching the sheets 26, 27 together along at least the edges thereof, to provide a liqid impermeable jacket, the attaching means preferably comprising stitching 28. Where stitching does comprise the attaching means overlapping portions 29 of the second sheet 27 will be provided, the stitching 28 passing through the overlapping portions 29, the first sheet 26, and the body of the second sheet 27, as indicated in FIG. 3. Further, the stitching will then be used to attach the fastener components 23, 24 to the sheets 26, 27.

A wide variety of materials may be utilized to provide the sheets 26, 27. For instance the first sheet 26 may be a polyvinyl or polyethylene film. The second sheet 27 may be any liquid resistant fabric which can provide sufficient structural integrity to the liquid impermeable film 26 to allow ready reuse of jacket 19, typical materials being Dacron and nylon. Whatever the materials, it is also desirable that precious metal containing liquids which impact thereon will readily drain off and/or can be rinsed off.

In the presently preferred embodiment illustrated in FIG. 3, there is also provided a piece of resilient material 31 operatively disposed along the length L of the jacket 19 at one edge thereof. The resilient material 31 may be a cylinder or tube of rubber, and is provided to facilitate the formation of a tight seal between the circumferential periphery 11 and the top radial peripheral surface 14 of the substrate 10. As illustrated clearly by the cut-out portion provided in FIG. 3, the piece of resilient material 31 may be covered by the overlapping portion 29 of the second sheet 27 along one longitudinal edge of the jacket 19, being held in place by the stitches 28.

The jacket 19 is wrapped around the substrate 10 circumferential periphery 11 by loosely placing it around the periphery 11, holding the hook fastening component 23 against the periphery 11 while pulling tightly on the pile fastening component 24 to overlap the components 23, 24, and then pressing the component 24 into engagement with the component 23. During the wrapping, care is taken to see that the top edge of the jacket 19 is the edge containing the resilient material piece 31, and that this top edge is substantially even with a plane containing the top radial peripheral surface 14 of the substrate 10. The width W of the jacket 19 is essentially equal to the height H of the substrate 10.

Alternatively, the jacket 19 could comprise a single layer of material. A fiber-reinforced water impermeable plastic film (e.g. vinyl) would be suitable.

A jacket-wrapped substrate according to the present invention is illustrated in FIG. 4. The substrate is placed in an upright vertical position, so that the passageways 13 extending therethrough are substantially vertical, on a conventional conveyor (e.g. perforated conveyor) 34 or the like, as it is passed through the precious metal shower station 3. At the station 3, as illustrated schematically in FIGS. 2 and 4, a shower of precious metal containing liquid (solution or suspension) is provided, the liquid flowing downwardly onto the top radial peripheral surface 14. Any conventional shower liquid can be utilized, such as an aqueous solution containing platinum, palladium, and barium. The solution passes through the passageways 13 and around the outside of the jacket 19, in contact with the outer periphery thereof. In this way the interior honeycomb structure of the substrate 10 is coated with precious metal. The liquid not adhering to the substrate 10 is conventionally collected, as illustrated schematically at 35 in FIG. 4, and ultimately recycled.

After passing through the precious metal shower 3, according to the method of the present invention the jacket-wrapped substrate 10 passes to a jacket removal station 37 (see FIG. 2). At that station, the pile fastener component 24 is grasped and relative movement between it and the hook fastener component 23 is effected, allowing the entire jacket 19 to be detached from the substrate 10 very readily. Normally the jacket 19 will be reused to wrap other substrates 10. Before being reused, however, it is desirable to rinse any precious metal containing liquid which may adhere to the exterior surface (i.e. second sheet 27) of the jacket 19 from the jacket. This is accomplished at a jacket rinse station illustrated schematically at 38 in FIG. 2. To accomplish this, the jacket 19 can merely be dipped in a bucket of water, sprayed with the rinse liquid, or the like. The rinse liquid is collected and eventually utilized (normally after further concentration) at the precious shower station, as illustrated schematically in FIG. 2.

Once the jacket 19 is removed from the substrate 10, it is passed to an oven 4 as is conventional. The final coated catalyst produced has the interior honeycomb structure 12 thereof coated with precious metal, however the circumferential periphery 11 of the substrate 10 is uncoated (or has greatly reduced concentration of precious metal compared to prior art components).

It will thus be seen that according to the present invention a simple and effective method for producing a coated catalyst having the exterior peripheral surface thereof uncoated, is provided. Additionally, a jacket suitable for practicing the method according to the invention is provided. While the invention has been herein shown and described in what is presently conceived to be the most practical and preferred embodiment thereof, it will be apparent to those of ordinary skill in the art that many modifications may be made thereof within the scope of the invention. For instance, the material which the jacket is made may be elastic, the jacket wrapping and unwrapping steps may be accomplished manually or can be mechanized, and the method may comprise or consist of the indicated steps. Thus, the invention is to be accorded the broadest interpretation of the appended claims so as to encompass all equivalent methods and devices.

What is claimed is:

1. A method of producing a coated catalyst from a cylindrical catalyst substrate having a circumferential periphery and an interior honeycomb structure, and utilizing a jacket of liquid impermeable material having first and second ends and fastening means for attaching the first and second ends together and having a height substantially the same as the height of the cylindrical catalyst, comprising the steps of substantially sequentially:

(a) covering the circumferential periphery of the substrate, said covering consisting of the substep of wrapping the jacket around the cylindrical catalyst substrate circumferential periphery and fastening the jacket ends together to provide a cylindrical catalyst substrate having the circumferential periphery thereof covered so that a precious metal liquid solution or suspension will not coat it;

(b) passing the wrapped cylindrical catalyst substrate through a shower of a precious metal liquid solution or suspension so that the honeycomb structure surfaces are coated with precious metal; and (c) removing the jacket by releasing the fastening means attaching the ends thereof together so as to provide a cylindrical catalyst substrate having a precious-metal coated interior honeycomb structure and a circumferential periphery uncoated by precious metal.

2. A method as recited in claim 1 comprising the further step of (d) reusing the removed jacket to wrap other cylindrical catalyst substrates.

3. A method as recited in claim 2 comprising the further step of, between steps (c) and (d), rinsing off the jacket with a rinse liquid, collecting the used rinse liquid, and utilizing the collected rinse liquid as a component of the shower of step (b).

4. A method as recited in claim 1 comprising the further steps of, prior to step (a), effecting an alumina wash coat of the cylindrical catalyst substrate and firing the alumina-washed cylindrical catalyst substrate in an oven, and cooling the fired alumina-washed cylindrical catalyst substrate; and comprising the further step of after step (c), firing the cylindrical catalyst substrate.

5. A method as recited in claim 4 wherein step (b) is practiced by passing the cylindrical catalyst substrate through a shower of an aqueous precious metal solution.

6. A method as recited in claim 2 comprising the further step of, prior to step (a), making the jacket of first and second layers of sheet material by attaching the layers together, the first layer comprising a liquid impermeable plastic film, and the second layer comprising a liquid resistant fabric having sufficient structural integrity to provide effective reuse of the jacket.

7. A method as recited in claim 6 wherein said jacket-making step is further accomplished by providing hook-and-pile fasteners to the first and second ends of the jacket as the fastening means thereof.

8. A method as recited in claim 6 wherein step (b) is accomplished by providing the shower onto the top radial peripheral surface of the cylindrical catalyst substrate with the cylindrical catalyst substrate having the axis thereof substantially vertical; and wherein the jacket-making step is further accomplished by providing a piece of resilient material along one elongated edge of the jacket; and wherein step (a) is further accomplished by wrapping the jacket so that the piece of resilient material is adjacent the top radial peripheral surface of the cylindrical catalyst substrate.

9. A method as recited in claim 2 comprising the further step of, prior to step (a), making the jacket by providing hook-and-pile fasteners at the first and second ends thereof to provide the fastening means.

10. A method as recited in claim 2 comprising the further step of, prior to step (a), making the jacket by providing a resilient tubular material along one elongated edge thereof, and wherein step (b) is accomplished by providing a shower onto the top radial peripheral surface of the cylindrical catalyst substrate with the cylindrical catalyst substrate having the axis thereof substantially vertical.

11. A method of producing a precious metal coated interior and uncoated exterior catalyst from a cylindrical catalyst substrate having a circumferential periphery and an interior honeycomb structure, utilizing a jacket of liquid impermeable material having first and second ends and hook-and-pile fasteners for attaching the first and second ends together and having a height substantially the same as the height of the cylindrical catalyst substrate, comprising the steps of:

(a) wrapping the jacket around the cylindrical catalyst substrate circumferential periphery and fastening the hook-and-pile fasteners at the jacket ends together to cover the circumferential periphery of the cylindrical catalyst substrate so that it will be protected from a shower of precious metal containing liquid;

(b) passing the wrapped cylindrical catalyst substrate through a shower of precious metal containing liquid so that the honeycomb structure surfaces are coated with precious metal;

(c) removing the jacket by separating the hook-and-pile fasteners at the jacket ends; and (d) reusing the removed jacket to practice step (a) for other cylindrical catalyst substrates.

12. A method as recited in claim 11 comprising the further step of, between (c) and (d), rinsing off the jacket with a rinse liquid, collecting the used rinse liquid, and utilizing the collected rinse liquid as a component of the shower of step (b).

* * * * *